No. 770,097. PATENTED SEPT. 13, 1904.
W. McMAHON.
DUMPING RECEPTACLE.
APPLICATION FILED AUG. 18, 1903.
NO MODEL.
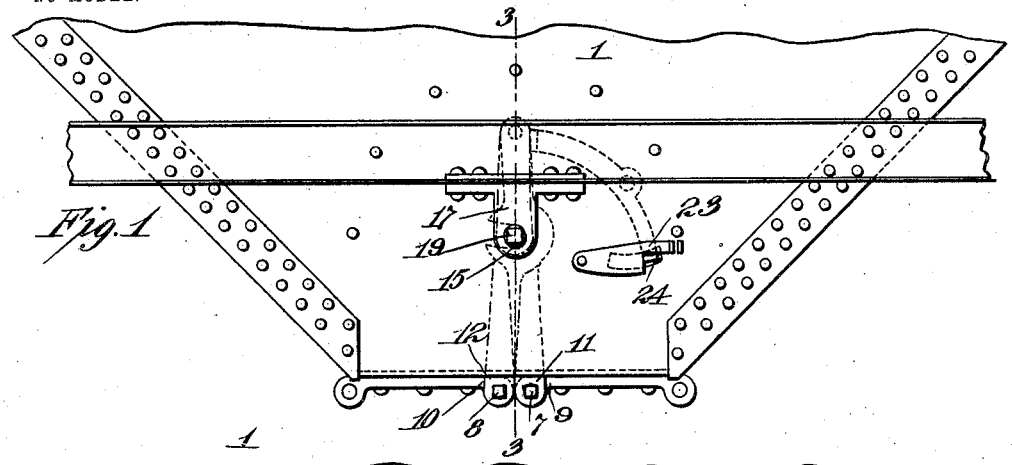
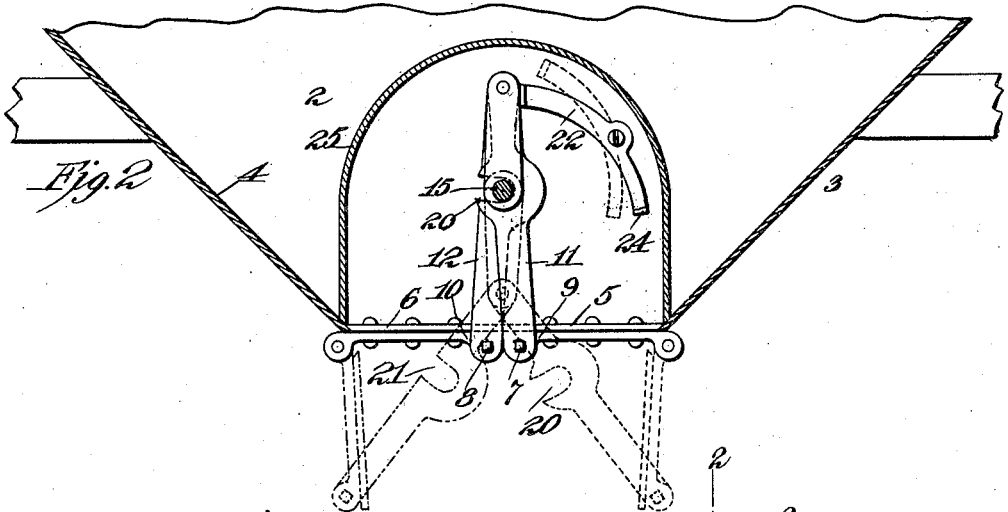
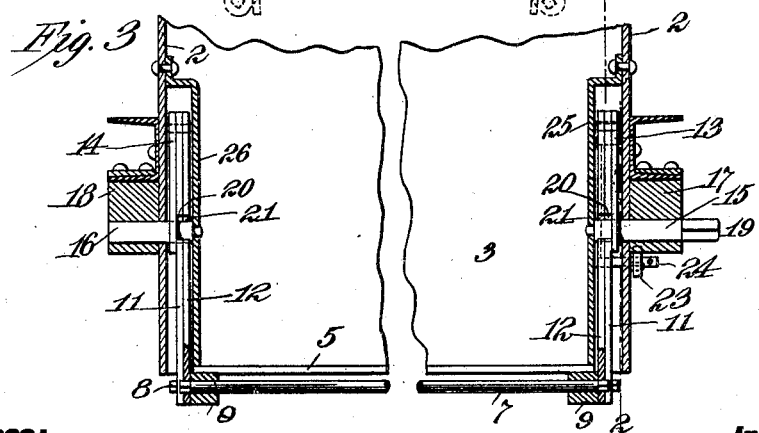
Witnesses:
Jas. F. Coleman
Jno. Robt Taylor
Inventor
William McMahon.
by Dyer and Dyer
Attorneys No. 770,097. Patented September 13, 1904.

UNITED STATES PATENT OFFICE.

WILLIAM McMAHON, OF RAHWAY, NEW JERSEY.

DUMPING-RECEPTACLE.

SPECIFICATION forming part of Letters Patent No. 770,097, dated September 13, 1904.

Application filed August 18, 1903. Serial No. 169,897. (No model.)

*To all whom it may concern:*

Be it known that I, WILLIAM McMAHON, a citizen of the United States, residing at Rahway, in the county of Union and State of New Jersey, have invented a certain new and useful Improvement in Dumping-Receptacles, of which the following is a description.

My invention relates to dumping-receptacles applicable to hoppers, bins, and generally to receptacles for the storage or transportation of materials. Its object is to produce a mechanism for opening, closing, and locking a gate or gates which form the dumping-bottom of the receptacle, which mechanism will be simple and effective in construction and operation and will have no shaft or other operating medium across the receptacle which would produce an obstruction to the free passage of the material out of the receptacle.

A further object is to provide means whereby the gates may be firmly and tightly closed and effectively opened, even if the inclosed material be frozen or caked by manual means alone.

In the accompanying drawings, Figure 1 is a side view of the receptacle with the dumping-gates closed, the operating-arms and locking device therefor being shown in dotted lines. Fig. 2 is a sectional view of the receptacle, taken on the lines 2 2 of Fig. 3, showing the dumping-gates closed and locked, the gates being shown in the open position by dotted lines; and Fig. 3 is a sectional view taken on the lines 3 3 of Fig. 1.

1 is the receptacle, having, preferably, vertical sides 2 and a double inclined bottom 3 4, producing a rectangular opening which is closed by the gates 5 6, such gates being hinged at their outer edges to the lower edges of the inclines 3 4 and when moved in a horizontal position to close the opening in the receptacle meet at their inner free edges. The gates are provided on their under sides and at their free edges with rock-shafts 7 8, turning in suitable bearing-blocks 9 10, attached to the gates or formed thereon. As shown in the drawings, these bearing-blocks are extensions of the supporting-hinges and are formed integral therewith. The ends of the rock-shafts 7 8 have rigidly secured to them links 11 12, extending upwardly inside of and parallel with the sides of the receptacle and pivoted on their upper ends to cranks 13 14, which are carried by stub-shafts 15 16, mounted to turn in bearings 17 18, secured to the sides of the receptacle in line with each other. The outside end of the shaft 15 is squared at 19 to receive a removable operating lever or wrench. The links 11 12 are slotted at 20 21, which slots pass over the stub-shafts 15 16 when the links are raised and the gates are closed, so as to form an effective support for the gates. A dog 22, pivoted to one side of the receptacle, can be thrown forward to abut against the crank 13, as shown in full lines in Fig. 2, when both cranks are raised to close the gates, preventing the opening of the gates until the dog is thrown back; but the use of such dog is not absolutely necessary, as the parts may be so proportioned as to remain closed. A latch 23, pivoted on the outside of the receptacle, engages with the angularly-bent extremity 24 of the dog, which extremity passes through a small opening in the sides of the receptacle.

In order to inclose the mechanism and protect it from injury and contact with the contents of the receptacle, casings 25 26 are provided and are secured to the sides of the receptacle.

To open the gates, the dog 22 is thrown back and a lever is applied to the crank-shaft 15, when by the turning of the crank to which the lever is applied the mechanism on both sides of the receptacle will be simultaneously operated to throw the links off of the stub-shafts and move them downwardly to open the gates, as shown in Fig. 2. This operation of mechanism on one side of the receptacle by turning of the crank on the other side is secured through the rock-shafts 7 8, journaled upon the free edges of the gates. These rock-shafts and the links are made sufficiently heavy so that the movement is transmitted from the mechanism on the other side of the receptacle without permitting sufficient lost motion to interfere with the proper simultaneous movement of the parts.

The gate-operating mechanism being supported entirely upon the sides of the receptacle does not involve the employment of a shaft passing through the receptacle or of other obstruction within the receptacle itself, which would interfere with the free flow of the material out of the receptacle when the gates are open. It is obvious that the same mechanism is applicable to a single gate, the mechanism of one gate being simply a duplicate of that of the other so far as the links and connecting rock-shaft are concerned.

While the device so far described is the preferred embodiment of my invention, it is to be understood that the same may be modified in divers ways. As an example of such modification the cranks and links may be mounted upon the outside of the receptacle. In this case the casings 25 and 26 may be placed on the outside of the receptacle or, if desired, may be omitted. This construction will possess the advantage that there will be no obstruction to the inside of the receptacle and its capacity will not be reduced.

What I claim is—

1. In a dumping-receptacle, the combination with a pair of gates, of mechanism on opposite sides of the receptacle for opening and closing the gates, and connections carried by the gates, and passing outside of and below the receptacle for connecting the two mechanisms, whereby the operation of either mechanism will produce simultaneous movements of the other, substantially as set forth.

2. In a dumping-receptacle, the combination with a hinged gate, of mechanism on opposite sides of the receptacle for opening and closing the gate, and a rock-shaft carried by the gate and passing across outside of and below the receptacle and connecting the two mechanisms, whereby the operation of either mechanism will produce simultaneous movements of the other, substantially as set forth.

3. In a dumping-receptacle, the combination with a hinged gate, of mechanism on opposite sides of the receptacle for opening and closing the gate, and a rock-shaft journaled upon the gate and swinging with it and connecting the two mechanisms, whereby the operation of either mechanism will produce simultaneous movements of the other, substantially as set forth.

4. In a dumping-receptacle, the combination with a hinged gate, of a rock-shaft journaled upon the free edge of the gate, cranks on the sides of the receptacle, and links secured to the ends of the rock-shaft and operatively connected with said cranks, such cranks being connected together only through the links and the rock-shaft carried by the gate, whereby the operation of either crank will produce corresponding movements of the other crank, substantially as set forth.

5. In a dumping-receptacle, the combination with two pivoted gates, of the two rock-shafts carried by the free edges of such gates, the two sets of links secured to the ends of such rock-shafts, and the cranks mounted on stub-shafts and connected with said links, substantially as set forth.

6. In a dumping-receptacle, the combination of a hinged gate, a rock-shaft carried by the gate at its free edge, links secured to the ends of said rock-shaft, cranks supported upon shafts and connected with said links, and locking-slots in the links engaging with said crank-shafts, substantially as set forth.

7. In a dumping-receptacle, the combination of a hinged gate, a rock-shaft carried by the gate at its free edge, links secured to the ends of said rock-shaft, cranks supported upon shafts and connected with said links, and locking means for supporting the gates in the closed position, substantially as set forth.

8. The combination with the receptacle 1, of the gates 5, 6, rock-shafts 7, 8, links 11, 12, having slots 20, 21, cranks 13, 14, crank-shafts 15, 16, and dogs 2, 3, substantially as set forth.

This specification signed and witnessed this 12th day of August, 1903.

WILLIAM McMAHON.

Witnesses:
JNO. ROBT. TAYLOR,
J. F. COLEMAN.